United States Patent [19]

Watanabe

[11] Patent Number: 4,634,978
[45] Date of Patent: Jan. 6, 1987

[54] MAGNETOMETER DIRECTION MEASURING SYSTEM REQUIRING NO EXTERNAL COMPASS

[75] Inventor: Yoshiteru Watanabe, Iwatsuki, Japan

[73] Assignee: Kabushiki Kaisha Saura Keiki Seisakusho, Tokyo, Japan

[21] Appl. No.: 515,258

[22] Filed: Jul. 19, 1983

[30] Foreign Application Priority Data

Jul. 31, 1982 [JP] Japan .................. 57-134591

[51] Int. Cl.$^4$ .................. G01K 33/04; G01C 17/28
[52] U.S. Cl. .................. 324/253; 324/246; 33/361; 340/987
[58] Field of Search .................. 324/253–255, 324/259–261, 244, 246, 262, 202; 33/361, DIG. 1; 340/870, 33, 987

[56] References Cited

U.S. PATENT DOCUMENTS

| | | | |
|---|---|---|---|
| 2,370,194 | 2/1945 | Riggs | 324/256 X |
| 2,376,883 | 5/1945 | Riggs et al. | 324/256 X |
| 2,695,384 | 11/1954 | Stuart, Jr. | 324/254 |
| 2,922,227 | 1/1960 | Turner et al. | 340/870.33 X |
| 3,233,171 | 2/1966 | Yamaguichi et al. | 324/253 |
| 3,260,930 | 7/1966 | Kawada | 324/253 |
| 3,434,047 | 3/1969 | Brickner | 324/253 |
| 3,644,825 | 2/1972 | Davis, Jr. et al. | 324/253 X |
| 3,808,508 | 4/1974 | Ford | 324/254 X |
| 3,812,428 | 5/1974 | Trenkler | 324/253 X |
| 3,959,889 | 6/1976 | Thomas | 324/253 X |
| 4,139,950 | 2/1979 | Zuvela | 324/255 X |
| 4,205,266 | 5/1980 | Lichtenberg | 324/253 |
| 4,272,724 | 6/1981 | Wada et al. | 324/253 |
| 4,290,018 | 9/1981 | Rhodes | 324/255 |
| 4,373,271 | 2/1983 | Nitz | 33/361 |
| 4,399,615 | 8/1983 | Matsumoto et al. | 324/254 X |
| 4,480,226 | 10/1984 | Kuno et al. | 324/253 X |

FOREIGN PATENT DOCUMENTS

| | | | |
|---|---|---|---|
| 280232 | 10/1965 | Australia . | |
| 285933 | 6/1966 | Australia . | |
| 0065165 | 5/1980 | Japan | 324/253 |
| 1000454 | 8/1965 | United Kingdom | 324/253 |
| 871105 | 10/1981 | U.S.S.R. | 324/260 |

OTHER PUBLICATIONS

Geyger, "The Ring-Core Magnetometer . . .", AIEEE Trans., vol. 81, No. 59, Mar. 1962, pp. 65–73.
Geyger, "Flux-Gate Magnetometer", Electronics, Jun. 1962, pp. 48–52.

Primary Examiner—Reinhard J. Eisenzopf
Assistant Examiner—Warren S. Edmonds
Attorney, Agent, or Firm—Wenderoth, Lind & Ponack

[57] ABSTRACT

A system for accurately measuring the direction in which a magnetometer is to be set has a simple construction and is little affected by iron structures on a hull. The system has a magnetometer which includes an excitation source, a magnetic core, an excitation AC winding and an output winding which are both wound around the magnetic core. The output winding is composed of two series connected coils which are wound around the magnetic core and have an equal number of turns. The measuring system applies an alternating current to the core having an amplitude large enough to saturate the magnetic core, and obtains an output from the output winding corresponding to the angle formed between the geomagnetic field direction and an imaginary line obtained by interconnecting the point of connection of the two coils and the central point of the magnetic core.

1 Claim, 20 Drawing Figures

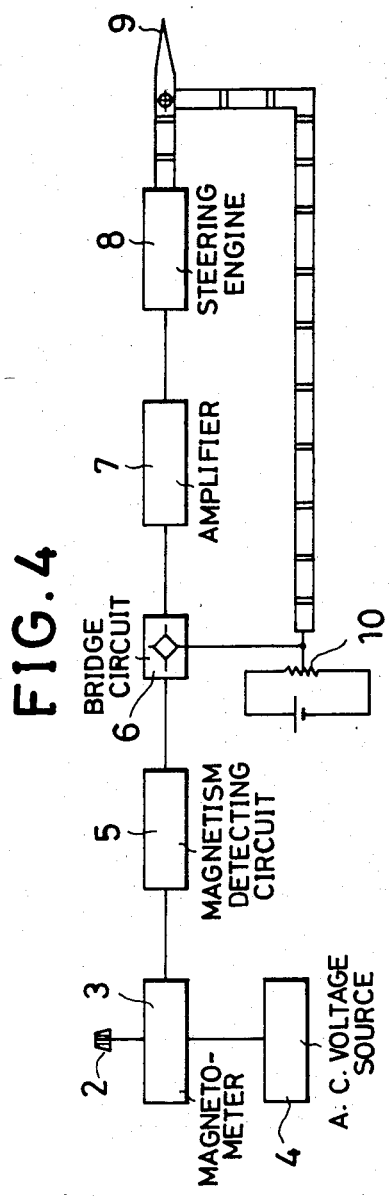
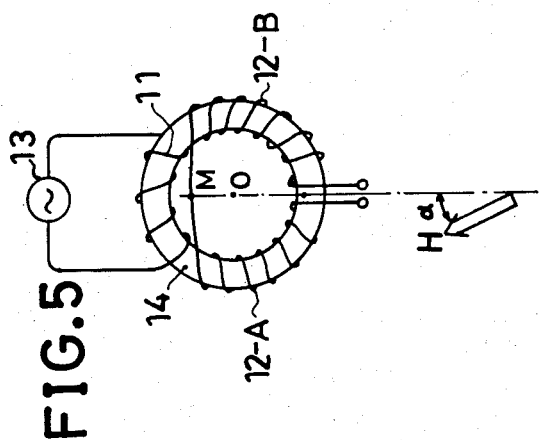

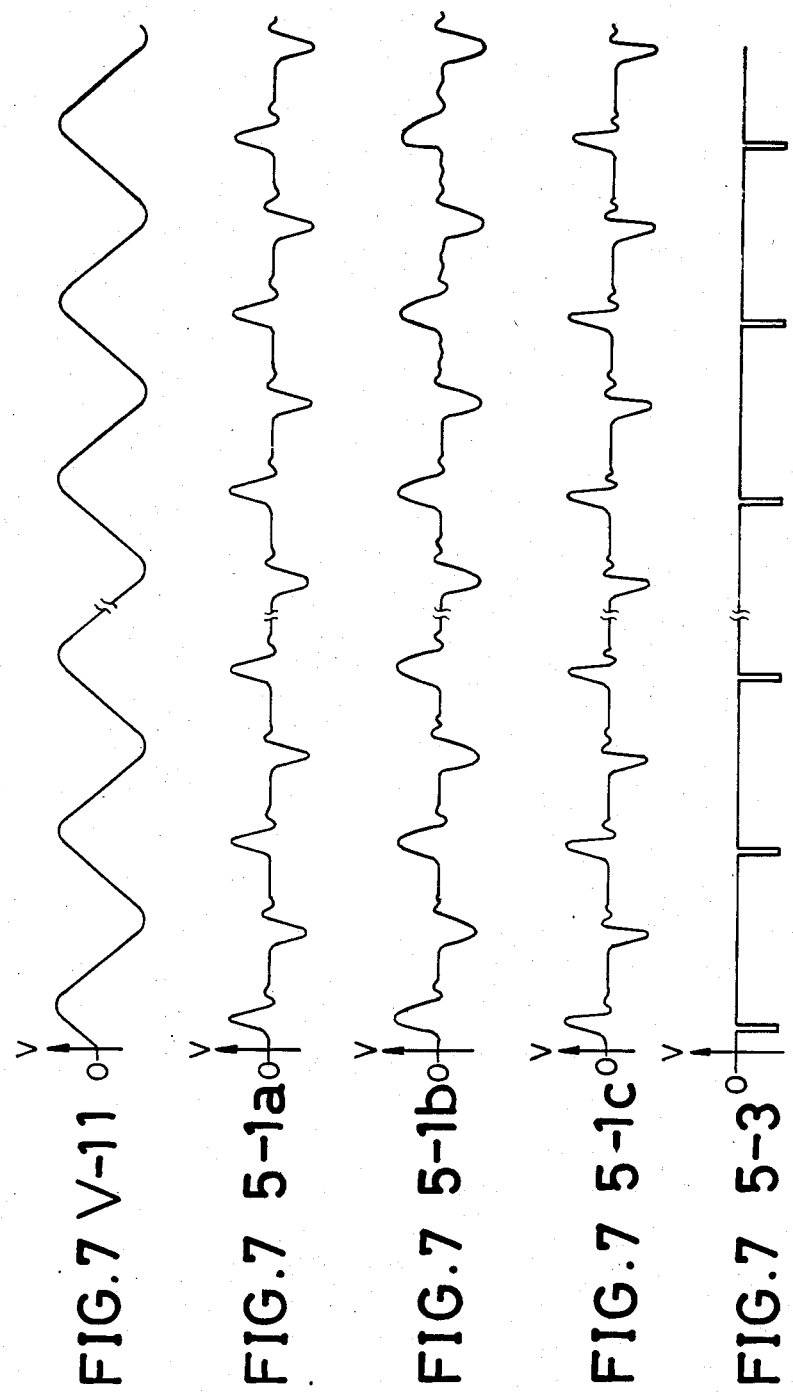

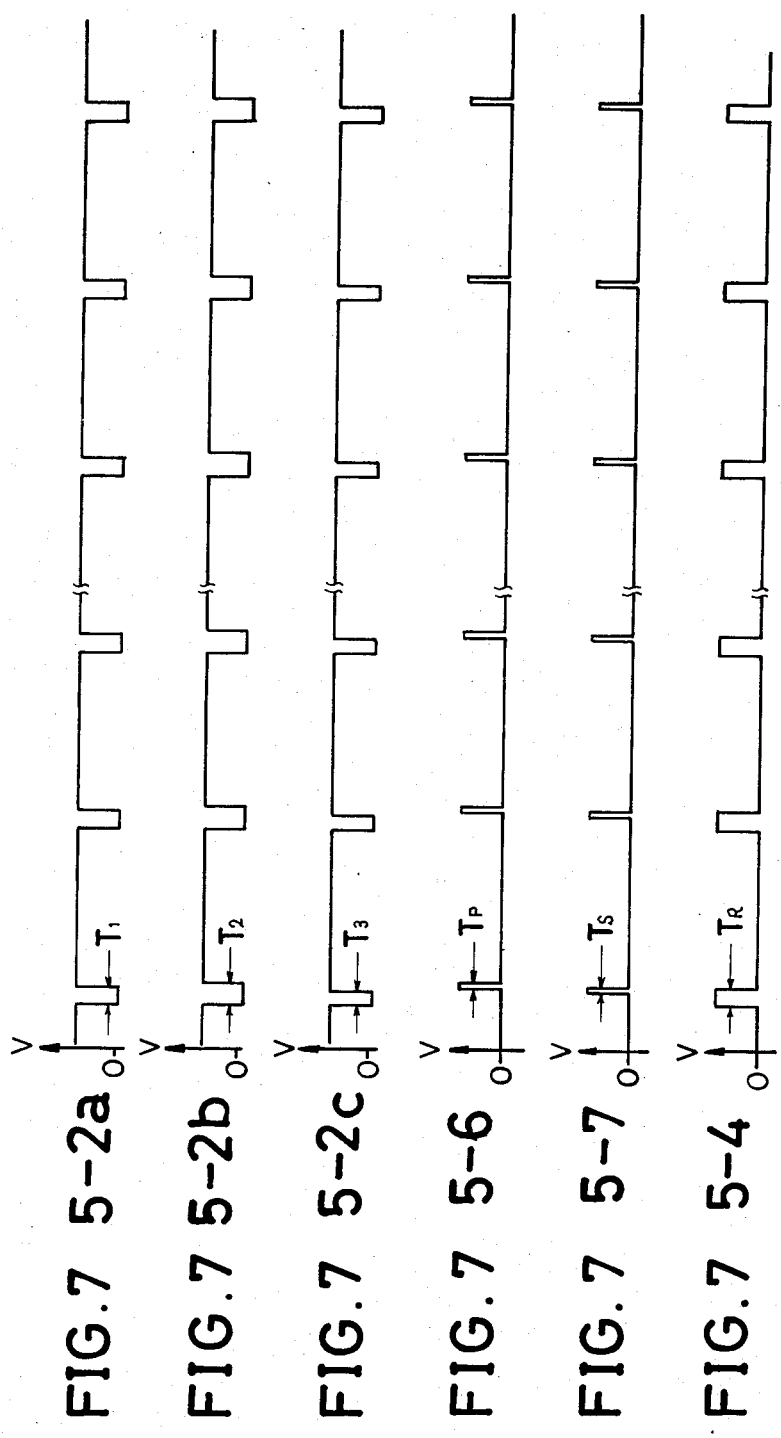

MAGNETOMETER DIRECTION MEASURING SYSTEM REQUIRING NO EXTERNAL COMPASS

BACKGROUND OF THE INVENTION

1. Field of the Invention

The present invention relates to a system for measuring the direction in which a magnetometer is to be set, without use of any compass such as a magnetic compass, gyrocompass, etc.

2. Description of the Prior Art

In a conventional automatic steering gear for automatically controlling the steerage of a ship, a controller (a magnetometer) 3 having a course setting knob 2 is superposed on a magnetic compass 1 as illustrated by a structural block diagram in FIG. 1 and operated as will be described afterward. Denoted by 4 is a source of AC voltage. An output corresponding to the operation of the course setting knob 2 is obtained in a magnetism detecting circuit 5 and is supplied to a pair of terminals of a bridge circuit 6. FIG. 2 is a schematic view of a magnetometer which has excitation AC winding 11 and output winding 12. When a magnetic core 20 and the aforementioned windings are set in position as illustrated, the output winding has a waveform shown by FIG. 3B. Shown by FIG. 3A is an excitation AC waveform. The waveform FIG. 3B stands for the second high frequency harmonic of the excitation AC waveform and satisfies the relationship of $V_1=V_2$. When the knob 2 of the controller is rotated to shift the windings in position relative to a magnetic needle, the output winding 12 has a waveform having the relationship of $V_1>V_2$ as shown by FIG. 3C. When the knob 2 is reversely rotated, the waveform has the relationship of $V_1<V_2$ as shown by FIG. 3D. This voltage, while the magnetism detecting circuit 5 regulates the angle of rotation of the knob and the variation in voltage, is supplied to one side of the bridge circuit 6. To another side of the bridge circuit is supplied an output from a follow-up potentiometer 10. The difference between the two outputs is output from the bridge circuit 6 and amplified in an amplifier 7. The amplified value causes a steering engine 8 to be driven and then a rudder 9 is allowed to move. The movement of the rudder 9 serves to actuate the follow-up potentiometer 10 and cause an input to the amplifier 7 to become zero. For this reason, the rudder 9 is set in a direction in which the knob 2 is rotated. As a result, the direction in which a ship advances relative to the magnetic needle 20 is to be recognized. A magnetic compass, when attached to a hull, gives rise to deviations due to iron structures on the hull and, in adopting automatic steering, sometimes causes a ship to advance meanderingly. A gyrocompass is used more frequently than a magnetic compass because the former has a better performance than the latter. However, a gyrocompass is disadvantageous in that a large amount of electrical power and a high rotation speed are required and consequently it becomes large in size.

SUMMARY OF THE INVENTION

The present invention has been accomplished in order to eliminate the aforementioned disadvantages.

An object of the present invention is to provide a system for accurately measuring the direction in which a magnetometer is to be set, which has a simple construction and which is little affected by iron structures on a hull.

To attain the object described above, according to the present invention, there is provided a system for measuring the magnetometer setting direction relative to the geomagnetic field direction, which comprises a magnetometer provided with a magnetic core having an excitation AC winding and output winding wound therearound, a means for supplying an alternating current having an amplitude large enough to saturate the magnetic core wherein the output winding has two coils which have an equal number of turns and which are connected in series, and wherein the output winding outputs a signal whose pulse width, varies in correspondence with an angle formed between an imaginary line drawn between the point of connection of the two coils and the center of the magnetic core and the geomagnetic field direction.

The aforementioned object and other objects and characteristic features of the present invention will become apparent from the description to be given hereinbelow with reference to the accompanying drawings.

BRIEF DESCRIPTION OF THE DRAWINGS

FIG. 4 is a structural block diagram showing one embodiment of the system according to the present invention.

FIG. 5 is a schematic view showing a magnetometer usable in the embodiment of FIG. 4.

FIGS. 7 V-11 and 5-1a to 5-4 show waveforms obtained by an embodiment of the present invention.

DESCRIPTION OF THE PREFERRED EMBODIMENT

Figure 1:
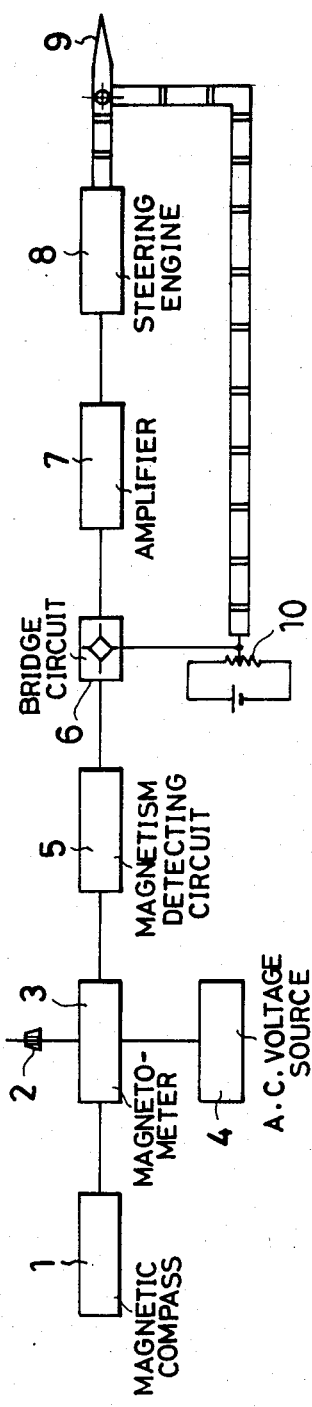
FIG. 1 is a block diagram illustrating the structure of a conventional automatic steering gear.
Figure 2:
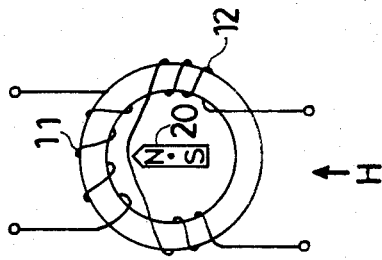
FIG. 2 is a schematic view illustrating a conventional magnetometer.
Figure 3:
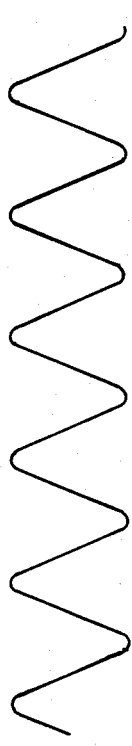
FIGS. 3A–3D show waveforms obtained by a conventional system.
Figure 3:
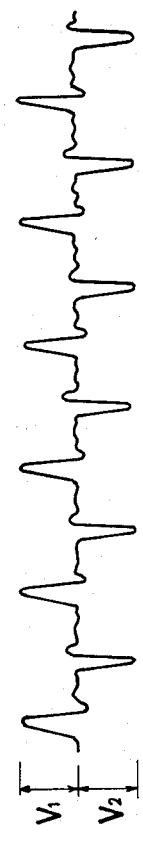
Figure 3:
Figure 3:
Figure 6:
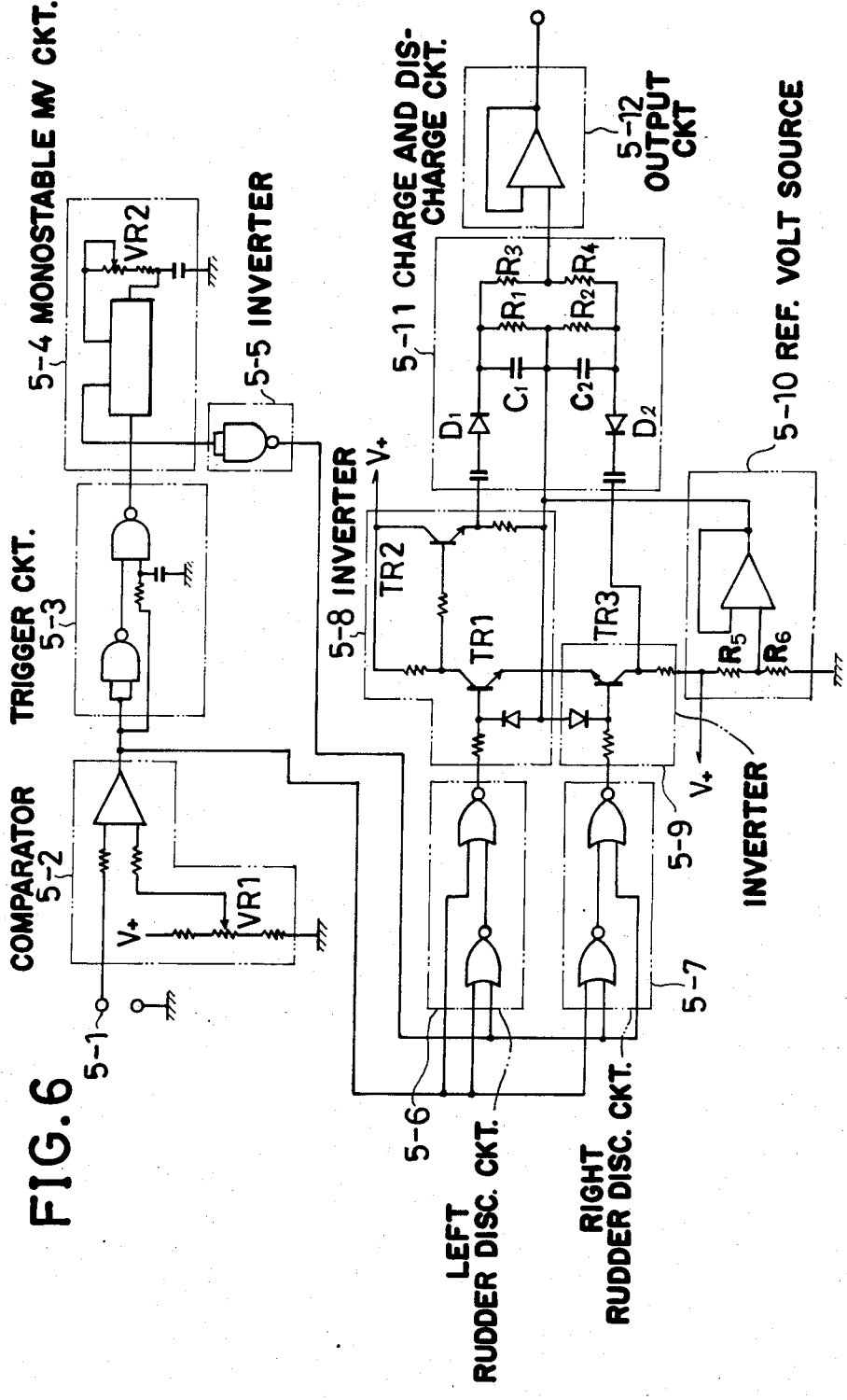
FIG. 6 is a concrete structural view showing the magnetism detecting circuit used in the embodiment of FIG. 4.

The present invention will now be described with reference to FIGS. 4–7. FIG. 4 is a block diagram showing the structure of one embodiment of the present invention which is applied to the automatic steering gear shown in FIG. 1. This embodiment does not use the magnetic compass 1 as superposed on the controller (the magnetometer) 3 in FIG. 1. The identical or similar components of this embodiment are denoted by like numerical symbols. A magnetometer shown in FIG. 5 has excitation AC winding 11 and a pair of output windings 12-A and 12-B having an equal number of turns, which are wound around a circular magnetic core 14. An excitation source 13 has an amplitude large enough to saturate the magnetic core 14 and corresponds to the AC voltage source 4 shown in FIG. 4. The output windings 12-A and 12-B are connected in series at a point M. An output corresponding to an angle $\alpha$ formed between a line interconnecting the point M and a center O of the circle defined by the magnetic core and the geomagnetic field direction is obtained from the output windings 12-A and 12-B. The output signal thus obtained is applied to a magnetism detecting circuit 5. FIG. 6 shows a concrete example of the construction of the magnetism detecting circuit 5. FIGS. 7 V-11 and 5-1a to 5-4 show signal waveforms in portions of the magnetism detecting circuit 5, which are denoted by like numerical symbols. That is, FIG. 7 5-3 illustrates the waveform of the output of circuit 5-3 of FIG. 6. FIGS. 7 5-1a to 1c and 7 5-2a to 2c respectively illustrate the outputs at point 5-1 and circuit 5-2 of FIG. 7 under three different operating conditions to be explained below. When the aforementioned angle $\alpha$ is 0°, the waveform at an input terminal 5-1 of the magnetism detecting circuit 5 is shown by FIG. 7 5-1a which has the relationship of $V_1=V_2$ similar to the waveform FIG. 3B. FIG. 7 V-11 illustrates the output of the excitation winding 11 shown in FIG. 5. Since a comparator circuit 5-2 detects only the positive voltage portion of the signal during one cycle thereof, the trigger point of circuit 5-2 is adjusted by a variable resistor VR1. An output from the comparator circuit 5-2 is a train of negative pulses as shown by FIG. 7 5-2a and the output is inputted to a direction discerning circuit for a left rudder 5-6, a direction discerning circuit for a right rudder 5-7 and a trigger circuit 5-3. The comparator 5-2 outputs a negative pulse when the voltage at input terminal 5-1 is greater than the voltage output by resistor VR1. In the trigger circuit 503 in FIG. 6, a trigger signal shown by FIG. 7 5-3 is produced by the leading edge of the pulse output of comparator 5-2. A monostable multivibrator 5-4 is set, and the pulse width of the monostable 5-4 is adjusted by a variable resistor VR2 so as to become identical with the width of the negative pulses of the comparison circuit 5-2. An output from the monostable multivibrator 5-4 is subsequently inverted by an inverter 5-5 and the resultant output is applied to the direction discerning circuits 5-6 and 5-7. The direction discerning circuits 5-6 and 5-7 are constituted respectively by NOR gates. When the position of rotation of the knob 2 of the controller allows the aforementioned angle $\alpha$ to be 0°, the pulsewidth $T_R$ of the monostable multivibrator 5-4 is equal to the pulsewidth $T_1$ of the output pulses of the comparison circuit 5-2 and, at this time, the outputs from both the direction discerning circuit for a left rudder 5-6 and the direction discerning circuit for a right rudder 5-7 are zero.

When the course setting knob 2 is rotated to port, the magnetic core 14 of the magnetometer is rotated to allow the angle $\alpha$ to be some finite number of degrees. Therefore, the output signal from the output windings 12-A and 12-B has a pulse waveform which is as shown by FIG. 7 5-1b. At this time, however, there is little variation in amplitude. For this reason, the pulse output from the comparison circuit 5-2 has a wide pulsewidth as shown by FIG. 7 5-2b and this pulse output is inputted to the direction discerning circuits 5-6 and 5-7. The pulsewidth $T_R$ of the output from the monostable multivibrator 5-4 and the pulsewidth $T_2$ of the output from the comparison circuit 5-2 are compared in the direction discerning circuit for left rudder 5-6 and, when $T_R<T_2$ is satisfied, the direction discerning circuit for a left rudder issues an output. That is to say, when the output signal from the direction discerning circuit for left rudder 5-6 is denoted by pulsewidth $T_P$, there is obtained an equation of $T_P=T_2-T_R$ and a narrow pulse of pulsewidth $T_P$ is obtained as shown in FIG. 7 5-6. The degree of the rotation angle $\alpha$ of the magnetic core 14 of the magnetometer is proportional to the pulsewidth $T_P$.

When the course setting knob 2 is rotated to starboard, there are obtained waveforms shown in FIGS. 7 5-1c and 5-2c. The direction discerning circuit for a right rudder 5-7 functions similar to the direction discerning circuit for a left rudder 5-6. When the output from the circuit 5-7 is denoted by pulsewidth $T_S$, there is obtained an equation of $T_S=T_R-T_3$ (wherein $T_3$ stands for the pulsewidth of the output of the comparison circuit 5-2). At this time, there is obtained a narrow pulse of pulsewidth $T_S$ as shown in FIG. 5-7.

The outputs from the direction discerning circuits 5-6 ad 5-7 are respectively inputted to inverters 5-8 and 5-9 which function to effect both a logic inversion and a level change. In a reference voltage source 5-10, the voltage $V_+$ is approximately halved when the resistors R5 and R6 are of the same resistance volue and supplied to the emitter circuits of transistors TR1 and TR3 constituting the inverters. The output of pulsewidth $T_P$ from the direction discerning circuit for a left rudder 5-6 is inverted by the transistor TR1 and then further inverted by a transistor TR2 so as to cause a diode $D_1$ in a charge and discharge circuit 5-11 to conduct. As a result, a capacitor $C_1$ is charged and, upon the passage of the pulse, electrical discharge occurs through at a resistor $R_1$. Therefore, the potential at the point of connection between resistors $R_3$ and $R_4$ is positive and a steering angle signal for porting the helm is obtained from an output conversion and takeout circuit 5-12. The output pulse of pulsewidth is inverted by the inverter 5-9 and a diode $D_2$ is charged in the negative direction. As a result, the potential at the point of connection between the resistors $R_3$ and $R_4$ is negative and a steering angle signal for starboarding the helm is obtained. Either of the steering angle signals is applied to a bridge circuit 6 shown in FIG. 4 to thereby effect automatic steering similarly to a conventional automatic steering gear. Since the controller (the magnetometer) 3 has heretofore been required to have a magnetic compass attached thereto, as described previously, it has taken much time to determine a place where the controller is to be set in order to prevent the magnetic compass from giving rise to deviation errors. However, since the magnetometer setting place is not restricted in the present invention, the present invention is advantageous over the conventional system.

Furthermore, in the conventional system adopting both the magnetic compass and the controller, the relative position between the magnetic needle and the coils of the controller becomes unstable due to pitching and rolling of a ship on a voyage, with the result that the knob operation is apt to be inaccurate and therefore that accuracy in measuring and reading out the steering angle cannot be improved. On the other hand, the present invention can accurately measure the steering angle because no compass is used and therefore because it is unnecessary to consider the aforementioned relative position on beginning a voyage.

As described above, according to the present invention, since an output corresponding to the angle formed relative to the geomagnetic field direction is obtained in the form of a variation in the pulsewidth of output pulse signals of the magnetometer, the pulse waveforms can subsequently be detected and the proper steering angle can easily be found.

What is claimed is:

1. A direction measuring system requiring no external compass for measuring a direction of an imaginary line of said system in relation to a geomagnetic field direction and for providing output pulses having equal pulsewidths corresponding thereto comprising:
   a magnetometer including a toroidal magnetic core having an AC excitation winding and an output winding wound thereon, wherein said AC excitation winding and said output winding are magnetically coupled by said toroidal magnetic core and wherein said output winding consists of a pair of series connected coils having an equal number of turns arranged so as to have first and second terminals and a third common terminal located between said pair of coils;

a comparator circuit having inputs respectively connected to said first terminal of said output winding and to a reference voltage, wherein said second terminal of said output winding is connected to a reference point which is common to said comparator circuit such that said comparator outputs a first voltage when a voltage across said output winding is greater than said reference voltage and outputs a second voltage when said voltage across said output winding is less than or equal to said reference voltage;

wherein, when an alternating current is supplied to said AC excitation winding with an amplitude which is sufficient to saturate said magnetic core, said comparator circuit outputs pulses having equal pulsewidths which are proportional to an angle between the geomagnetic field direction and an imaginary line drawn between a geometric center of said toroidal magnetic core and said third terminal located between said pair of coils.

* * * * *